US009189964B1

(12) United States Patent
Rathinam et al.

(10) Patent No.: US 9,189,964 B1
(45) Date of Patent: Nov. 17, 2015

(54) SYSTEM, MODULE, AND METHOD FOR PRESENTING RUNWAY TRAFFIC INFORMATION

(75) Inventors: Sethu R. Rathinam, Cedar Rapids, IA (US); Sarah Barber, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1106 days.

(21) Appl. No.: 12/322,442

(22) Filed: Feb. 3, 2009

(51) Int. Cl.
| | | |
|---|---|---|
| *G06F 19/00* | (2011.01) | |
| *G06G 7/70* | (2006.01) | |
| *G06G 7/76* | (2006.01) | |
| *G08G 5/06* | (2006.01) | |
| *G01S 13/91* | (2006.01) | |
| *G01S 13/93* | (2006.01) | |

(52) U.S. Cl.
CPC .............. *G08G 5/06* (2013.01); *G01S 2013/916* (2013.01); *G01S 2013/9335* (2013.01); *G01S 2205/005* (2013.01); *G08G 5/065* (2013.01)

(58) Field of Classification Search
CPC .............. G01C 23/00; G01S 2013/916; G01S 2013/9335; G01S 2205/005; G08G 5/0026; G08G 5/0047; G08G 5/0078; G08G 5/04; G08G 5/06; G08G 5/065
USPC ................... 701/3, 14, 16, 17, 117, 120, 301; 342/29–37; 340/945, 947, 951, 953, 340/961, 963, 971–973, 995.1–995.28
See application file for complete search history.

(56) References Cited

U.S. PATENT DOCUMENTS

| | | | | |
|---|---|---|---|---|
| 4,845,629 A | * | 7/1989 | Murga | 701/120 |
| 6,462,697 B1 | * | 10/2002 | Klamer et al. | 342/36 |
| 6,606,563 B2 | * | 8/2003 | Corcoran, III | 701/301 |
| 6,850,185 B1 | * | 2/2005 | Woodell | 342/30 |
| 6,862,519 B2 | * | 3/2005 | Walter | 701/120 |
| 7,623,044 B2 | * | 11/2009 | Pepitone et al. | 340/950 |

(Continued)

OTHER PUBLICATIONS

RTCA DO-272A/EUROCAE ED-99A, published 2004; RTCA DO-191/EUROCAE ED-99A, published 2004.*

(Continued)

*Primary Examiner* — Jeffrey Shapiro
(74) *Attorney, Agent, or Firm* — Angel N. Gerdzhikov; Donna P. Suchy; Daniel M. Barbieri

(57) ABSTRACT

A present novel and non-trivial system, module, and method for presenting runway traffic information are disclosed. A partitioned runway awareness zone is established using data received from a source of navigation reference data, where such data could represent runway information, runway awareness zone information, or partitioned runway awareness zone information. After traffic data is received from a source such as an ADS-B, each section of the partitioned runway zone occupied by traffic is determined. Based upon the determination, an advisory data set comprising traffic information is generated and provided to a presentation system, where the advisory data set could include alert data based upon a level of threat. A presentation system used to present traffic information could include a visual display unit(s), an aural alert unit, and/or a tactile alert unit. A portable device such as handheld may be used to present traffic information.

21 Claims, 8 Drawing Sheets

(56) References Cited

U.S. PATENT DOCUMENTS

| | | | |
|---|---|---|---|
| 7,739,167 B2* | 6/2010 | Breen et al. | 705/35 |
| 7,796,055 B2* | 9/2010 | Clark et al. | 340/972 |
| 7,860,641 B2* | 12/2010 | Meunier | 701/120 |
| 7,962,279 B2* | 6/2011 | Pepitone et al. | 701/120 |
| 7,965,223 B1* | 6/2011 | McCusker | 342/29 |
| 8,019,529 B1* | 9/2011 | Sharma et al. | 701/117 |
| 8,193,948 B1* | 6/2012 | Shapiro et al. | 340/965 |
| 8,457,812 B2* | 6/2013 | Zammit-Mangion et al. | 701/15 |
| 8,694,237 B1* | 4/2014 | Romine, III | 701/301 |
| 8,970,402 B1* | 3/2015 | Innis | 340/977 |
| 2003/0105580 A1* | 6/2003 | Walter | 701/120 |
| 2004/0145499 A1* | 7/2004 | Schmidt et al. | 340/947 |
| 2004/0225432 A1* | 11/2004 | Pilley et al. | 701/117 |
| 2004/0225440 A1* | 11/2004 | Khatwa et al. | 701/301 |
| 2005/0015202 A1* | 1/2005 | Poe et al. | 701/301 |
| 2005/0078006 A1* | 4/2005 | Hutchins et al. | 340/561 |
| 2007/0078591 A1* | 4/2007 | Meunier et al. | 701/120 |
| 2007/0078592 A1* | 4/2007 | Meunier et al. | 701/120 |
| 2008/0042880 A1* | 2/2008 | Ramaiah et al. | 340/958 |
| 2008/0106438 A1* | 5/2008 | Clark et al. | 340/972 |
| 2009/0265090 A1* | 10/2009 | Poe et al. | 701/120 |
| 2010/0004800 A1* | 1/2010 | Zammit-Mangion et al. | 701/3 |
| 2010/0017105 A1* | 1/2010 | Pepitone et al. | 701/120 |
| 2010/0097241 A1* | 4/2010 | Suddreth | 340/972 |
| 2010/0109936 A1* | 5/2010 | Levy | 342/30 |
| 2011/0125400 A1* | 5/2011 | Michel et al. | 701/208 |
| 2011/0184635 A1* | 7/2011 | Khatwa et al. | 701/120 |

OTHER PUBLICATIONS

U.S. Appl. No. 11/820,950, filed Jun. 21, 2007, Krenz et al.

U.S. Appl. No. 12/210,061, filed Sep. 12, 2008, Woodell et al.

"MK V and MK VII Enhanced Ground Proximity Warning System (EGPWS) and Runway Awareness Advisory System (RAAS) Pilot Guide", Dec. 2003, 060-4241-000, Rev. E, Honeywell International, Inc.

RAAS (Runway Awareness and Advisory System) Operator Presentation, Mar. 20, 2008, Honeywell.

Cassell et al, "Pathprox—A Runway Incursion Alerting System", AIAA 19$^{th}$ Annual Avionics Systems Conference, 2000, IEEE.

Cassell, "Application of Pathprox Runway Incursion Alerting to General Aviation Operators", 24$^{th}$ AIAA/IEEE Digital Avionics Systems Conference, Oct. 30, 2005.

Smith et al, "System-Wide ADS-B Back-Up and Validation", 2006 Integrated Communications, Navigation & Surveillance Conference, 2006, NASA.

Smith et al, "Methods to Provide System-Wide ADS-B Back-Up, Validation and Security", 25$^{th}$ Digital Avionics System Conference, Oct. 15, 2006, 3D1, IEEE.

Smith et al, "ADS-X—Next Generation Surveillance Solutions", Oct. 2006, ATCA.

Moertl, "ATSA-Surf-Alert Flight Deck-Based Runway Safety Alerts", Aug. 1-2, 2007, MITRE Center for Advanced Aviation System Development (CAASD).

"Runway Incursions—A Call for Action", Air Line Pilots Association International ("ALPA") White Paper, Mar. 2007, ALPA.

* cited by examiner

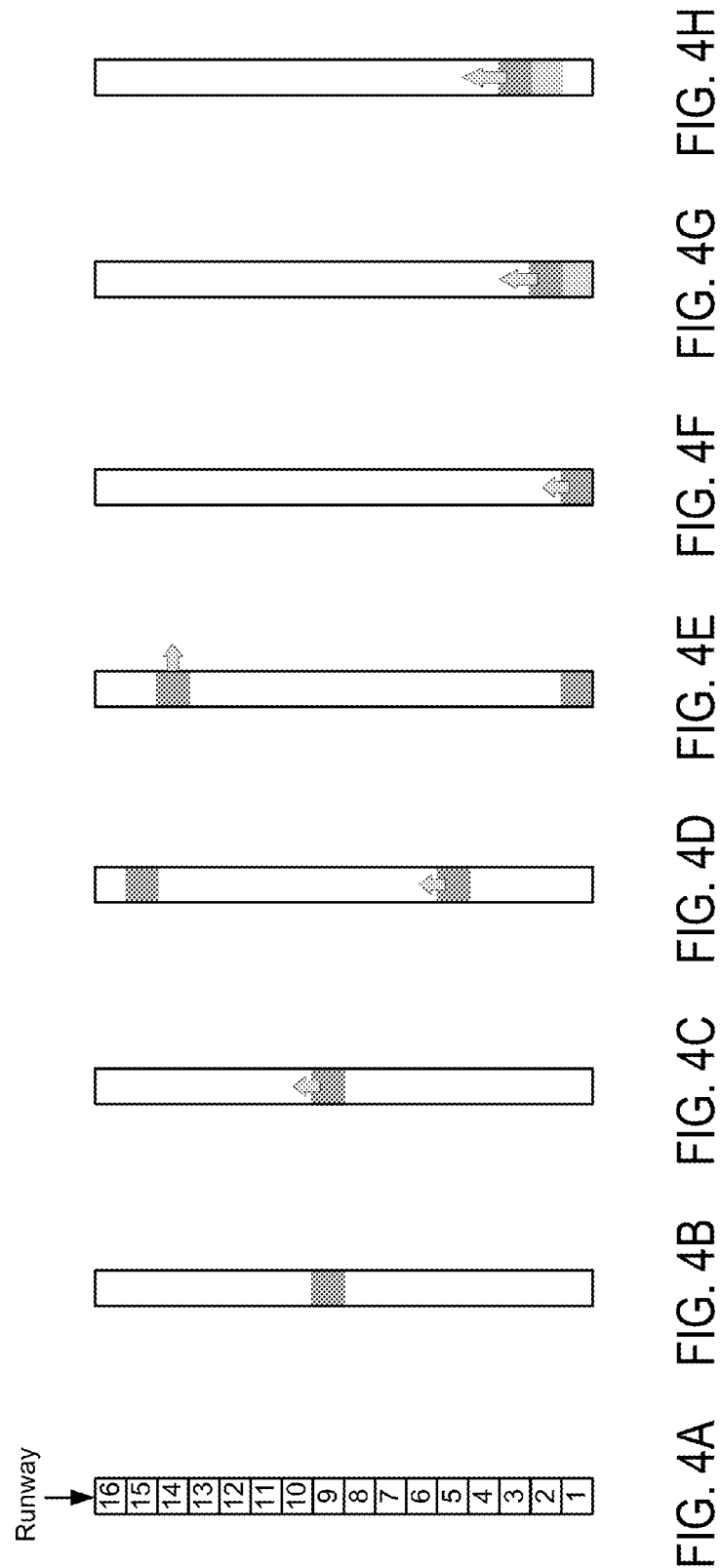

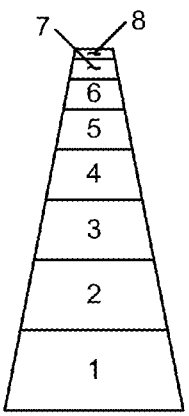 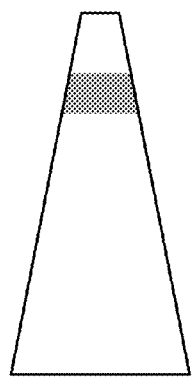 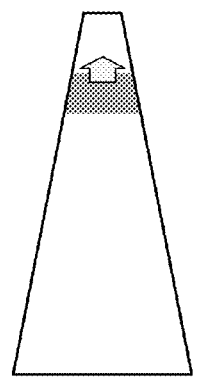 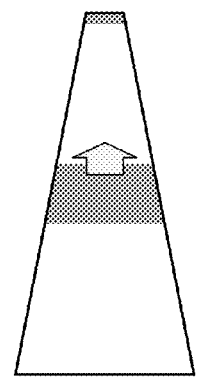
FIG. 5A    FIG. 5B    FIG. 5C    FIG. 5D
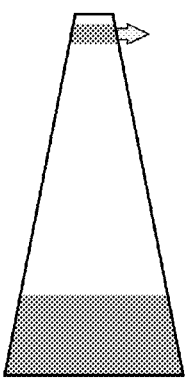 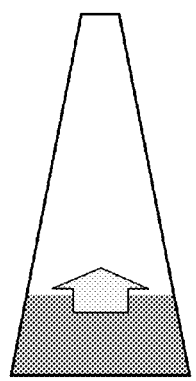 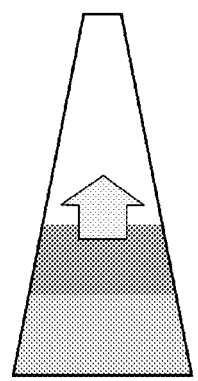 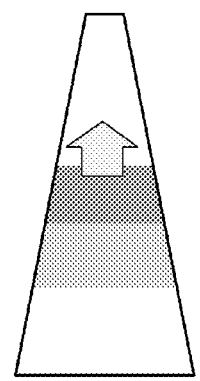
FIG. 5E    FIG. 5F    FIG. 5G    FIG. 5H

SYSTEM, MODULE, AND METHOD FOR PRESENTING RUNWAY TRAFFIC INFORMATION

BACKGROUND OF THE INVENTION

1. Field of the Invention

This invention pertains generally to the field of display units and/or crew alerting units that provide flight and/or ground information to the pilot or flight crew of an aircraft.

2. Description of the Related Art

Runway incursions are the most noticeable form of taxi navigation errors. Increased scrutiny by regulatory authorities has only heightened the awareness of the safety issues related to runway incursions. Taxi navigation errors cause many runway incursions and present potential collision hazards.

A root cause of many taxi navigation errors is the loss of situational awareness during taxi operations. Taxi diagrams have helped correct the problem associated with the loss of situational awareness. However, taxi diagrams require the pilot to look down and read a taxi chart while operating the aircraft that is under power. This is analogous to looking down into one's car to read details from a roadmap or GPS navigation screen while driving. Accordingly, the embodiments herein provide a solution to taxi navigation errors by the development of a novel system, devices, and methods to alleviate the difficulties of reading a taxi map while taxiing.

Current runway incursion presentation concepts including alerting concepts treat the runway surface as a single entity for alerting purposes; that is, an "all or nothing" approach is taken. Concepts provide either a visual and/or an aural presentation that a runway incursion is in progress or imminent. Visual presentation concepts paint or highlight the runway in its entirety or outline (or frame) the runway in different colors. By treating a runway surface as a single entity for alerting purposes, a recipient of runway traffic information may receive false alerts and/or alerting.

Also, current runway incursion concepts provide traffic information by depicting a symbol of the traffic and presenting textual information adjacent to the symbol on the display. Although this provides a pilot with useful information, the symbol and textual information continually moves as the traffic moves. Also, the depiction of too much information tends to clutter a display, especially if traffic information is overlaid with flight symbology and/or airport surfaces are depicted as outlines instead of solids. Situational awareness and safety may deteriorate by cluttering the display and not presenting runway traffic with clean visual cues.

BRIEF SUMMARY OF THE INVENTION

A present novel and non-trivial system, module, and method are disclosed for presenting runway traffic information. As disclosed herein, only localized portions of a runway occupied by traffic are highlighted based upon a partitioned runway awareness zone, thereby eliminating the "all or nothing" concepts currently employed by runway incursion presentation systems. Situational awareness is enhanced by depicting clean and focused visual cues while reducing the clutter of the display and the impact of false alerts associated with current runway incursion presentation systems.

In one embodiment, a system is disclosed for presenting traffic information. The system comprises a source of navigation reference data, a source of traffic data, a processor, and a presentation system. A processor is configured or programmed to establish a partitioned runway awareness zone using navigation reference data, receive traffic data, determine each section of the partitioned runway zone occupied by the traffic, and based on the determination, generate advisory data and provide such data to a presentation system. As embodied herein, a presentation system could comprise of one or more visual display units, an aural alert unit, and/or a tactile alert unit, where a recipient may be presented with non-textual or textual information, aural information, and/or tactile information. In an additional embodiment, a source of navigation data may be included from which a processor receives navigation data. Based upon the navigation data and traffic data, a level of threat may be determined and data representative of the level of threat may be included in the generation of the advisory data.

In another embodiment, a module is disclosed for presenting traffic information. The module comprises an input communications interface used to facilitate the receiving of data between a data source and a processor, a processor, and an output communications interface to facilitate the providing of advisory data to a presentation system. As discussed above, a processor is configured or programmed to establish a partitioned runway awareness zone using navigation reference data, receive traffic data, determine each section of the partitioned runway zone occupied by the traffic, and based on the determination, generate advisory data and provide such data to a presentation system, whereby traffic information is presented to a recipient as non-textual visual information, textual visual information, aural alert information, and/or tactile alert information. In an additional embodiment, a processor may receive navigation data, and based upon the navigation data and traffic data, may determine a level of threat and data representative of the level of threat may be included in the generation of the advisory data.

In another embodiment, a method is disclosed for presenting traffic information. The method establishes a partitioned runway awareness zone using data received from a navigation reference data source, receives traffic data, determines each section of the partitioned runway zone occupied by the traffic, and based on the determination, generates advisory data and provides such data to a presentation system, whereby traffic information is presented to a recipient as non-textual visual information, textual visual information, aural alert information, and/or tactile alert information. In an additional embodiment, a processor receives navigation data, and based upon the navigation data and traffic data, determines a level of threat, whereby data representative of the level of threat may be included in the generation of the advisory data.

BRIEF DESCRIPTION OF THE DRAWINGS

FIG. 4A provides an illustration of a runway awareness zone partitioned into sixteen (16) sections.

FIG. 4B provides a first exemplary illustration of how runway traffic may be depicted on a strategic display unit using the partitioned sections of a runway awareness zone of FIG. 4A.

FIG. 4C provides a second exemplary illustration of how runway traffic may be depicted on a strategic display unit using the partitioned sections of a runway awareness zone of FIG. 4A.

FIG. 4D provides a third exemplary illustration of how runway traffic may be depicted on a strategic display unit using the partitioned sections of a runway awareness zone of FIG. 4A.

FIG. 4E provides a fourth exemplary illustration of how runway traffic may be depicted on a strategic display unit using the partitioned sections of a runway awareness zone of FIG. 4A.

FIG. 4F provides a fifth exemplary illustration of how runway traffic may be depicted on a strategic display unit using the partitioned sections of a runway awareness zone of FIG. 4A.

FIG. 4G provides a sixth exemplary illustration of how runway traffic may be depicted on a strategic display unit using the partitioned sections of a runway awareness zone of FIG. 4A.

FIG. 4H provides a seventh exemplary illustration of how runway traffic may be depicted on a strategic display unit using the partitioned sections of a runway awareness zone of FIG. 4A.

FIG. 5A provides an illustration of a runway awareness zone partitioned into eight (8) sections.

FIG. 5B provides a first exemplary illustration of how runway traffic may be depicted on a tactical display unit using the partitioned sections of a runway awareness zone of FIG. 5A.

FIG. 5C provides a second exemplary illustration of how runway traffic may be depicted on a tactical display unit using the partitioned sections of a runway awareness zone of FIG. 5A.

FIG. 5D provides a third exemplary illustration of how runway traffic may be depicted on a tactical display unit using the partitioned sections of a runway awareness zone of FIG. 5A.

FIG. 5E provides a fourth exemplary illustration of how runway traffic may be depicted on a tactical display unit using the partitioned sections of a runway awareness zone of FIG. 5A.

FIG. 5F provides a fifth exemplary illustration of how runway traffic may be depicted on a tactical display unit using the partitioned sections of a runway awareness zone of FIG. 5A.

FIG. 5G provides a sixth exemplary illustration of how runway traffic may be depicted on a tactical display unit using the partitioned sections of a runway awareness zone of FIG. 5A.

FIG. 5H provides a seventh exemplary illustration of how runway traffic may be depicted on a tactical display unit using the partitioned sections of a runway awareness zone of FIG. 5A.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
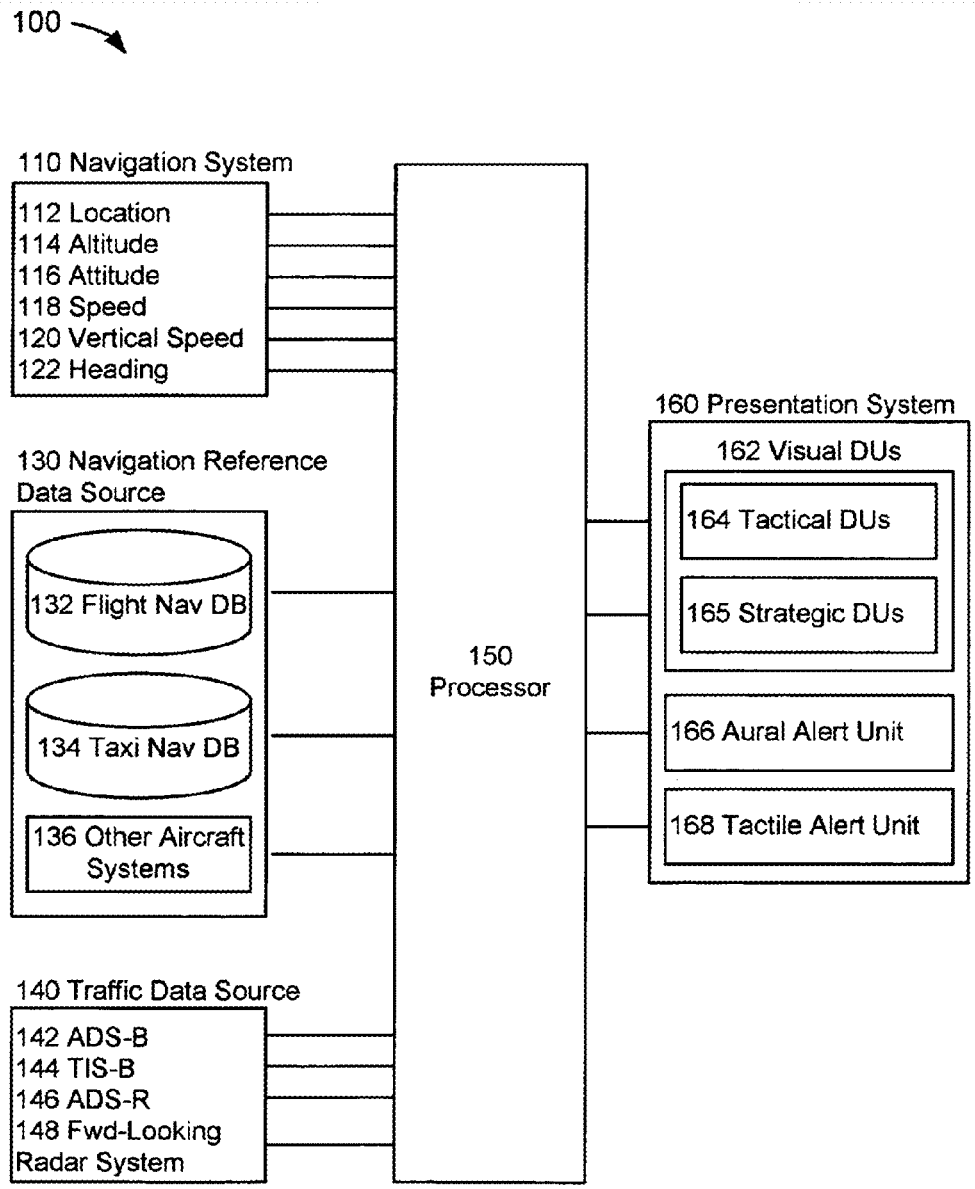
FIG. 1 depicts a block diagram of a runway traffic presentation system.

FIG. 1 depicts a block diagram of a runway traffic presentation system 100 suitable for implementation of the techniques described herein. The runway traffic presentation system 100 of an embodiment of FIG. 1 could include navigation system 110, a navigation reference data source 130, a traffic data source 140, a processor 150, and a presentation system 160.

In an embodiment of FIG. 1, a navigation system 110 comprises the system or systems that could provide navigation data information in an aircraft. It should be noted that data, as embodied herein for any source or system in an aircraft, could be comprised of any analog or digital signal, either discrete or continuous, which could contain information. As embodied herein, aircraft could mean any vehicle which is able to fly through the air or atmosphere including, but not limited to, lighter than air vehicles and heavier than air vehicles, wherein the latter may include fixed-wing and rotary-wing vehicles. A navigation system 110 may include, but is not limited to, an air/data system, an attitude heading reference system, an inertial guidance system (or inertial reference system), a global navigation satellite system (or satellite navigation system), and a flight management computing system, all of which are known to those skilled in the art. As embodied herein, a navigation system 110 could provide navigation data including, but not limited to, geographic position 112, altitude 114, attitude 116, speed 118, vertical speed 120, and heading 122. As embodied herein, aircraft position comprises geographic position (e.g., latitude and longitude coordinates) and altitude, and direction may be derived from either geographic position, aircraft position, or both. Also, aircraft orientation may include pitch, roll, and/or yaw information related to the attitude of the aircraft. As embodied herein, navigation system data may be provided to a processor 150 for subsequent processing as discussed herein.

In an embodiment of FIG. 1, a navigation reference data source 130 could comprise any source of runway data. A navigation reference data source 130 may include, but is not limited to, a flight navigation database 132, a taxi navigation database 134, and other aircraft systems 136.

A flight navigation database 132 may contain records which provide runway data. A flight navigation database 132 could contain data associated with ground-based navigational aids, waypoints, holding patterns, airways, airports, heliports, instrument departure procedures, instrument arrival procedures, instrument approach procedures, runways, precision approach aids, company routes, airport communications, localizer and airway markers, restrictive airspace, airport sector altitudes, enroute airways restrictions, enroute communications, preferred routes, controlled airspace, geographical references, arrival and/or departure flight planning, path point records, GNSS Landing Systems. Such flight navigation database 132 could be provided by an aircraft system such as, but not limited to, an FMS, a system known to those skilled in the art.

It should be noted that data contained in any database discussed herein including a flight navigation database 132 and taxi navigation database 134 may be stored in a digital memory storage device or computer-readable media including, but not limited to, RAM, ROM, CD, DVD, hard disk drive, diskette, solid-state memory, PCMCIA or PC Card, secure digital cards, and compact flash cards. Data contained in such databases could be loaded while an aircraft is on the ground or in flight. Data contained in such databases could be provided manually or automatically through an aircraft system capable of receiving and/or providing such manual or automated data. Data contained in such databases could be temporary in nature; for example, a temporary runway closure could be stored in a flight navigation database 132. Any database used in the embodiments disclosed herein may be a stand-alone database or a combination of databases.

A taxi navigation database 134, such as one described by Krenz et al in U.S. patent Ser. No. 7,974,773, may be used to store airport data that may be comprised of, in part, airport surfaces and airport visual aids. Airport surfaces include, but are not limited to, locations and information delineating or defining locations of runways, taxiways, and apron areas, fixed based operators ("FBOs"), terminals, and other airport facilities. Airport visual aids include, but are not limited to, airport pavement markings, runway markings, taxiway markings, holding position markings, airport signs, mandatory instruction signs, location signs, direction signs, destination signs, information signs, runway distance remaining signs, and lighting.

Other aircraft systems 136 could comprise a source of runway data. For example, both a terrain awareness and warning system ("TAWS") and an airspace awareness and warning system ("AAWS") may utilize airport data which may contain, in part, runway data. As embodied herein, a navigation reference data source 130 could provide runway data to a processor 150 for subsequent processing as discussed herein.

In an embodiment of FIG. 1, a traffic data source 140 could comprise any source for providing runway traffic information to a processor 150. A traffic data source 140 could include, but is not limited to, an automatic dependent surveillance-broadcast ("ADS-B") system 142, a traffic information service-broadcast ("TIS-B") system 144, an automatic dependent surveillance-rebroadcast ("ADS-R") system 146, a forward-looking radar system 148, or any combination thereof. As embodied herein, traffic may include any aircraft, vehicle, or any other object which could cause runway incursion. Although the following discussion will be drawn to aircraft, the embodiments herein are not limited to aircraft.

An ADS-B system 142 could be a traffic data source 140 for providing traffic data to a processor 150. An aircraft equipped with an ADS-B system 142 may receive position or location reports from other aircraft. In an ADS-B system 142, periodic transmissions of information may automatically be provided without pilot or operator input, where such information could include, but is not limited to, position or location, heading, altitude, speed, aircraft category, and call sign. Information transmitted in an ADS-B system 142 may be derived from one or more systems of a navigation system 110 including, but not limited to, a global navigation satellite system or flight management system. An aircraft equipped with an ADS-B system 142 may also receive information from a TIS-B system 144 and/or ADS-R system 146, where a TIS-B system 144 may broadcast traffic data and provide an aircraft equipped with an ADS-B system 142 with position or location information of aircraft not equipped with an ADS-B system 144. An ADS-R system 146 may be necessary to provide signals from an aircraft operating on different datalink and to transmit broadcast service information.

A forward-looking radar system 148 could be a traffic data source 140 for providing traffic data to a processor 150. A system, module, and/or method for generating runway traffic with a forward-looking radar system is described by McCusker in U.S. Pat. No. 7,965,223, which is incorporated by reference in its entirety. As embodied herein, traffic data from a traffic data source 140 may be provided to a processor 150 for subsequent processing.

In an embodiment of FIG. 1, a processor 150 may be any electronic data processing unit which executes software or source code stored, permanently or temporarily, in a digital memory storage device or computer-readable media (not depicted herein) including, but not limited to, RAM, ROM, CD, DVD, hard disk drive, diskette, solid-state memory, PCMCIA or PC Card, secure digital cards, and compact flash cards. A processor 150 may be driven by the execution of software or source code containing algorithms developed for the specific functions embodied herein. Common examples of electronic data processing units are microprocessors, Digital Signal Processors (DSPs), Programmable Logic Devices (PLDs), Programmable Gate Arrays (PGAs), and signal generators; however, for the embodiments herein, the term processor is not limited to such processing units and its meaning is not intended to be construed narrowly. For instance, a processor could also consist of more than one electronic data processing units. As embodied herein, a processor 150 could be a processor(s) used by or in conjunction with any other system of the aircraft including, but not limited to, a processor(s) associated with a navigation system, a traffic data source 140, a traffic alert and collision avoidance system ("TCAS"), a vision system such as, but not limited to, a synthetic vision system ("SVS"), an enhanced vision system ("EVS"), a combined SVS-EVS, or any combination thereof; for example, although depicted separately in FIG. 1, processor 150 could be included or made part of providing system 160 or any of the other separately enumerated systems.

A processor 150 may be programmed or configured to receive as input data representative of information obtained from various systems and/or sources including, but not limited to, navigation system 110, a navigation reference data source 130, and a traffic data source 140. As embodied herein, the terms "programmed" and "configured" are synonymous. A processor 150 may be electronically coupled to systems and/or sources to facilitate the receipt of input data; as embodied herein, operatively coupled may be considered as interchangeable with electronically coupled. A processor 150 may be programmed or configured to execute the methods discussed in detail below. A processor 150 may be programmed or configured to provide output data to various systems and/or units including, but not limited to, a presentation system 160. A processor 150 may be electronically coupled to systems and/or units to facilitate the providing of output data representative of a procedure. It is not necessary that a direct connection be made; instead, such receipt of input data and the providing of output data could be provided through a data bus or through a wireless network.

A presentation system 160 could be comprised of any unit which may present the pilot with visual, aural, and/or tactile indications regarding a status or condition of runway traffic including, but not limited to, visual display units 162, aural alerting unit 166, and/or tactile alerting unit 168. Visual display units 162 could be comprised of a tactical display unit(s) 164, and/or a strategic display unit(s) 165. As embodied herein, visual display units 162 may include a vision system (not shown) which generates an image data set which represents the image displayed on a display unit. Vision systems include, but are not limited to, SVS, EVS, combined SVS-EVS, or combination thereof. As embodied herein, the disclosures may apply to a portable device, including but not limited to, handheld devices which employ a display unit and/or aural alert unit.

A tactical display unit 164 could be any unit which presents tactical information to the relative to the instant or immediate control of the aircraft, whether the aircraft is in flight or on the ground. A tactical display unit 164 could be a Head-Down Display ("HDD") unit and/or a Head-Up Display ("HUD") unit. An HDD unit is typically a unit mounted to an aircraft's flight instrument panel located in front of a pilot and below the windshield and the pilot's field of vision. A HUD unit is mounted in front of the pilot at windshield level and is directly in the pilot's field of vision. The HUD system is advantageous because the display is transparent allowing the pilot to keep his or her eyes "outside the cockpit" while the display unit provides tactical flight information to the pilot.

A tactical display unit 164 could display the same information found on a primary flight display ("PFD"), such as "basic T" information (i.e., airspeed, attitude, altitude, and heading). Although it may provide the same information as that of a PFD, a tactical display unit 164 may also display a plurality of indications or information including, but not limited to, selected magnetic heading, actual magnetic track, selected airspeeds, selected altitudes, altitude barometric correction setting, vertical speed displays, flight path angle and drift angles, flight director commands, limiting and operational speeds, mach number, radio altitude and decision height, final approach trajectory deviations, and marker indications. A tactical display unit 164 is designed to provide flexible configurations which may be tailored to the desired configuration specified by a buyer or user of the aircraft.

Figure 2A:
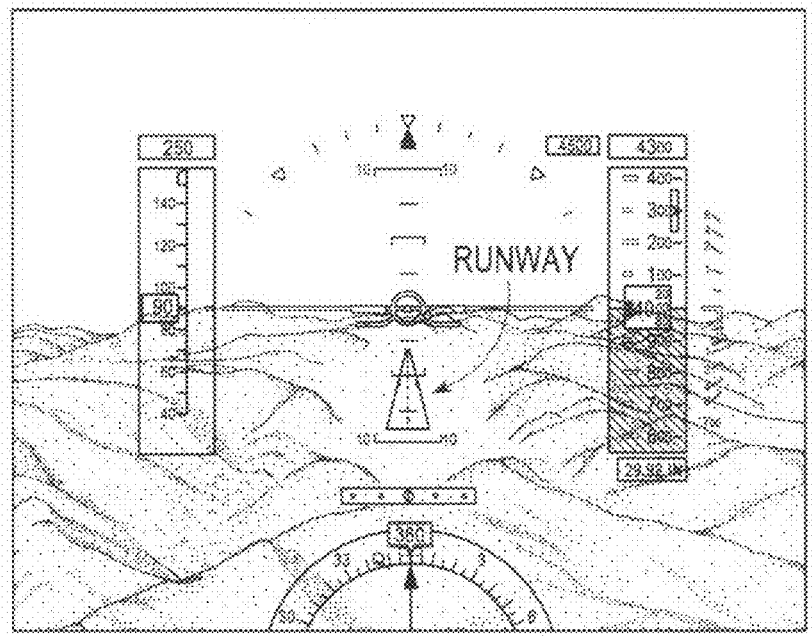
FIG. 2A provides an exemplary depiction of an HDD unit for presenting tactical information.

FIG. 2A provides an exemplary depiction of an HDD unit for presenting tactical information to the pilot or flight crew against the background of a three-dimensional image of terrain and sky; an HDD unit could be employed as a display unit in a synthetic vision system ("SVS"), an enhanced vision system ("EVS"), or combination of both ("combined SVS-EVS"). FIG. 2A provides an exemplary depiction of an HDD unit presenting an image of a runway located within a three-dimensional display of terrain. It should be noted that the tactical information depicted on the HDD unit has been made minimal for the sake of presentation and is not indicative of the plurality of indications or information with which it may be configured. Because the indications or information shown in FIG. 2A are well-known to those skilled in the art, a discussion of the specific tactical information shown in FIG. 2A is not provided herein.

Figure 2B:
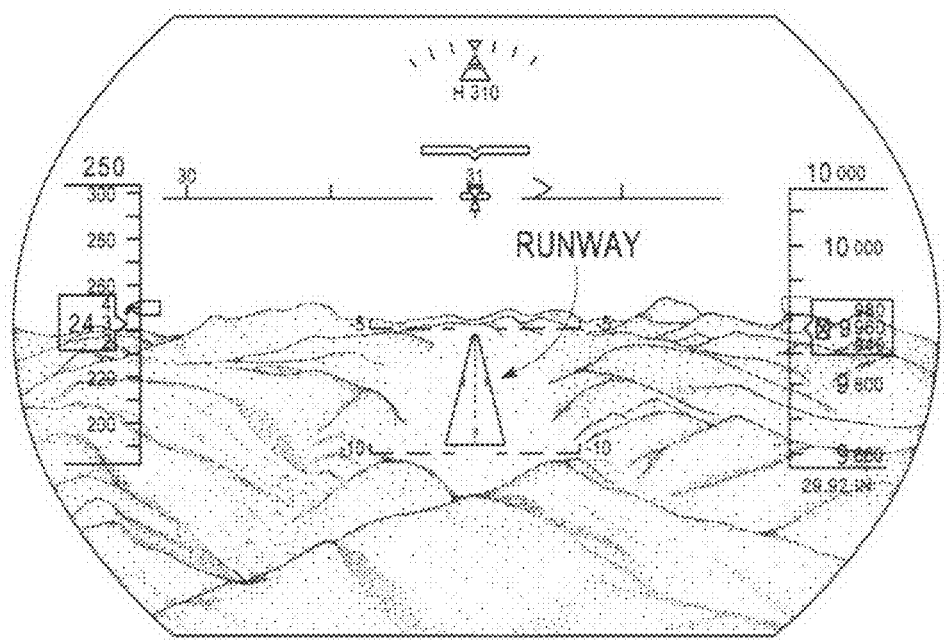
FIG. 2B provides an exemplary depiction of a HUD unit for presenting tactical information.

FIG. 2B provides an exemplary depiction of a HUD unit for presenting tactical information to the pilot or flight crew against the background of a three-dimensional image of terrain and sky; a HUD unit could be employed as a display unit in a synthetic vision system, an enhanced vision system, or combination of both. FIG. 2B provides an exemplary depiction of a HUD unit presenting an image of a runway located within a three-dimensional display of terrain. It should be noted that the tactical information depicted on the HUD unit has been made minimal for the sake of presentation and is not indicative of the plurality of indications or information with which it may be configured.

Returning to FIG. 1, a strategic display unit 165 could be any unit which presents strategic information to the crew relative to the intended future state(s) of the aircraft (e.g. intended location in space at specified times) along with information providing contextual information to the crew (e.g. terrain, navigation aids, geopolitical boundaries, airspace boundaries, runway traffic and/or incursion information, etc.) about such state(s). One example of such display unit is commonly referred to as a Navigation Display. In some configurations, the strategic display unit could be part of an Electronic Flight Information System ("EFIS"). On these systems, runway traffic and/or incursion information may be displayed separately or simultaneously with information of other systems. In one embodiment herein, runway traffic and/or incursion information may be displayed simultaneously with terrain and weather information with no loss or a negligible loss of displayed information. A strategic display unit 165 is designed to provide flexible configurations which may be tailored to the desired configuration specified by a buyer or user of the aircraft.

Figure 2C:
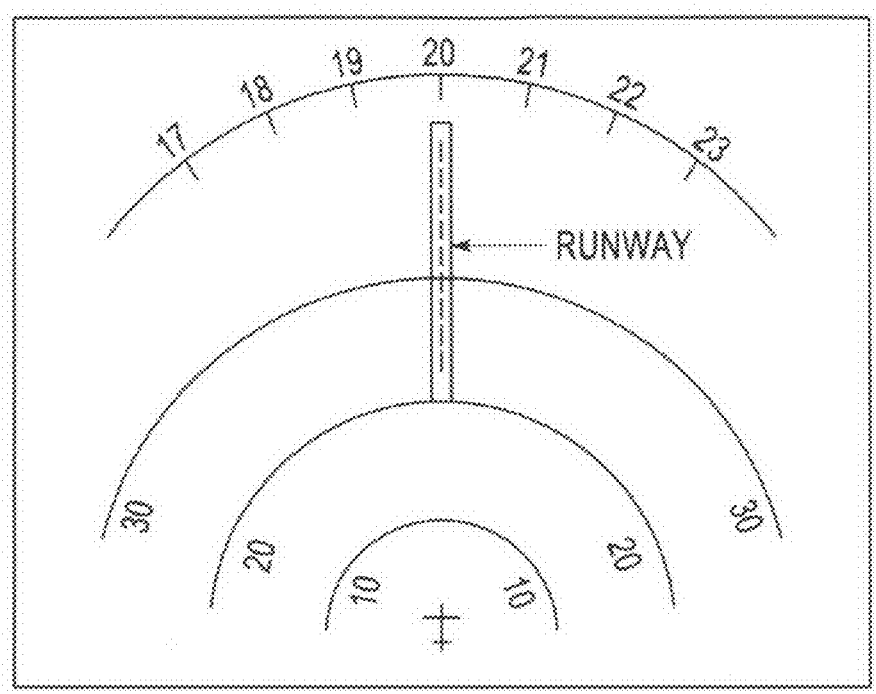
FIG. 2C provides an exemplary depiction of a display unit for presenting strategic information.

FIG. 2C provides an exemplary depiction of a strategic display unit 165 for presenting strategic information to the pilot or flight crew. FIG. 2C provides an exemplary depiction of how a runway may be presented on a strategic display unit 165. It should be noted that the strategic information depicted has been made minimal for the sake of presentation and is not indicative of the plurality of indications or information with which it may be configured. Because the indications or information shown in FIG. 2C are well-known to those skilled in the art, a discussion of the specific strategic information shown in FIG. 2C is not provided herein.

Returning to FIG. 1, visual display units 162 could be capable of presenting advisory information which may be information that is projected or displayed on a cockpit display unit to present a condition, situation, or event to the pilot including other display units in addition to a tactical display unit 164 and strategic display unit 165. Advisory information may include alerts and/or non-alert(s). Alerts may be based on level of threat or conditions requiring immediate crew awareness or attention. Caution alerts may be alerts requiring immediate crew awareness in which subsequent corrective action will normally be necessary. Warning alerts may be alerts requiring immediate crew action. As embodied herein, both caution and warning alerts may be presented in combination with or simultaneously to aural alerts and/or tactile alerts. Non-alerts may be any other advisory information not requiring immediate crew attention or awareness. Alerts may be presented visually by depicting one or more colors which may be presented on a display unit indicating one or more levels of threat. For the purpose of illustration and not limitation, amber or yellow may indicate a caution alert, red may indicate a warning alert, and green or cyan may indicate a non-alert.

Figure 2D:
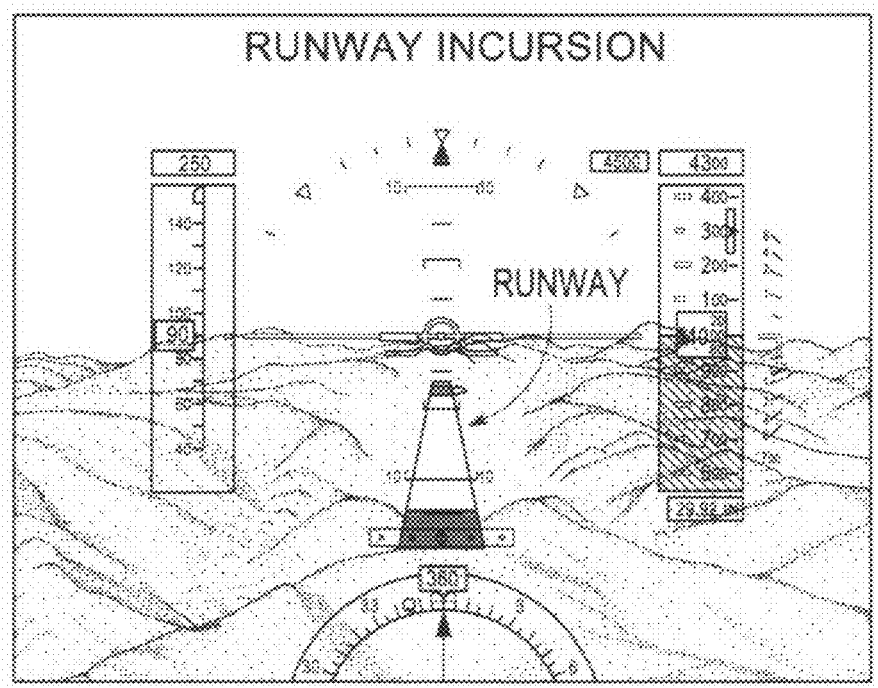
FIG. 2D provides an exemplary depiction of a display unit for presenting non-textual and textual traffic information.

In one embodiment, visual alerts could be presented in a textual form including text messages such as an amber or yellow "RUNWAY INCURSION" when the conditions for a caution alert have been met or a red "RUNWAY INCURSION" when the conditions for a warning alert have been met. In another embodiment, visual alerts could be presented in non-textual forms including, but not limited to, highlighting one or more portions of a runway depicted on a display unit corresponding to one or more partitioned sections of a runway awareness zone as discussed in detail below. In another embodiment, non-textual and textual forms could be displayed in color to indicate the level of threat, e.g., amber or yellow may indicate a caution alert and red may indicate a warning alert. In another embodiment, non-textual and textual forms could remain steady or flash intermittently, where such flashing could depend on the distance between a first aircraft ("own-ship") and other traffic, where such flashing could represent a specific range to the other traffic. FIG. 2D provides a depiction of a tactical display unit 164 presenting a textual form of a visual alert "RUNWAY INCURSION" where the color could be red if the alert is a warning or yellow or amber if the alert is a caution. Also, FIG. 2D provides a depiction presenting a non-textual form highlighting two portions of a runway as shown in FIG. 5E below that are depicted on a display unit corresponding to two partitioned sections of a runway awareness zone.

It should be noted that the disclosure herein will discuss visual alerts which present a textual form with the words "RUNWAY INCURSION" included and aural form with the words "RUNWAY INCURSION" included. As embodied herein, the words should be construed as generic words and not words which limit the presentation to the recipient. For the purpose of illustration and not limitation, a non-exhaustive list of words that may be used (where such words may depend on the conditions experiences by an aircraft either on the ground or in flight) could include, but are not limited to, "CAUTION—TRAFFIC," "CAUTION—TRAFFIC ON RUNWAY," "CAUTION, TRAFFIC AT 12 O'CLOCK," "WARNING—TRAFFIC," "WARNING—TRAFFIC ON RUWNAY," "WARNING—TRAFFIC AT 12 O'CLOCK," "WARNING—TRAFFIC 4000 FEET AHEAD," "WARNING—GO AROUND," and "WARNING—GO AROUND—TRAFFIC 4000 FEET AHEAD."

Returning to FIG. 1, an aural alerting unit 166 may be any unit capable of producing aural alerts. Aural alerts may be discrete sounds, tones, and/or verbal statements used to annunciate a condition, situation, or event. In one embodiment, an aural alert could call out "CAUTION—RUNWAY INCURSION" when the conditions for a caution alert have been met or "WARNING—RUNWAY INCURSION" when the conditions for a warning alert have been met, and either or both could be accompanied with tonal indicators. As embodied herein, both caution and warning aural alerts could be presented in combination with or simultaneous to visual alerts and/or tactile alerts.

In an embodiment of FIG. 1, a tactile alerting unit 168 may be any unit capable of producing tactile alerts. Tactile alerts may be any tactile stimulus to present a condition, situation, or event to the pilot. As embodied herein, tactile alerts could be presented in combination with or simultaneous to visual alerts and/or tactile alerts.

The advantages and benefits of the embodiments discussed herein may be illustrated by showing examples of how situational awareness of a runway environment is enhanced by presenting traffic information based upon traffic falling within a runway awareness zone. To demonstrate how a runway awareness zone may be established using location information provided from one or more navigation reference data sources 130, the drawings of FIG. 3 depict runway and a plurality of runway awareness zones. For the purpose of discussion only, Runways 8-26 of Rifle/Garfield County Regional Airport ("RIL") in the State of Colorado, United States has been selected for discussion. As discussed herein, the runway depiction and runway data information may have been modified for the sake of illustration and is not suitable for navigation. For example, the runway is not drawn to scale and the runway markings have been modified for the actual markings for the sake of brevity.

Figure 3A:
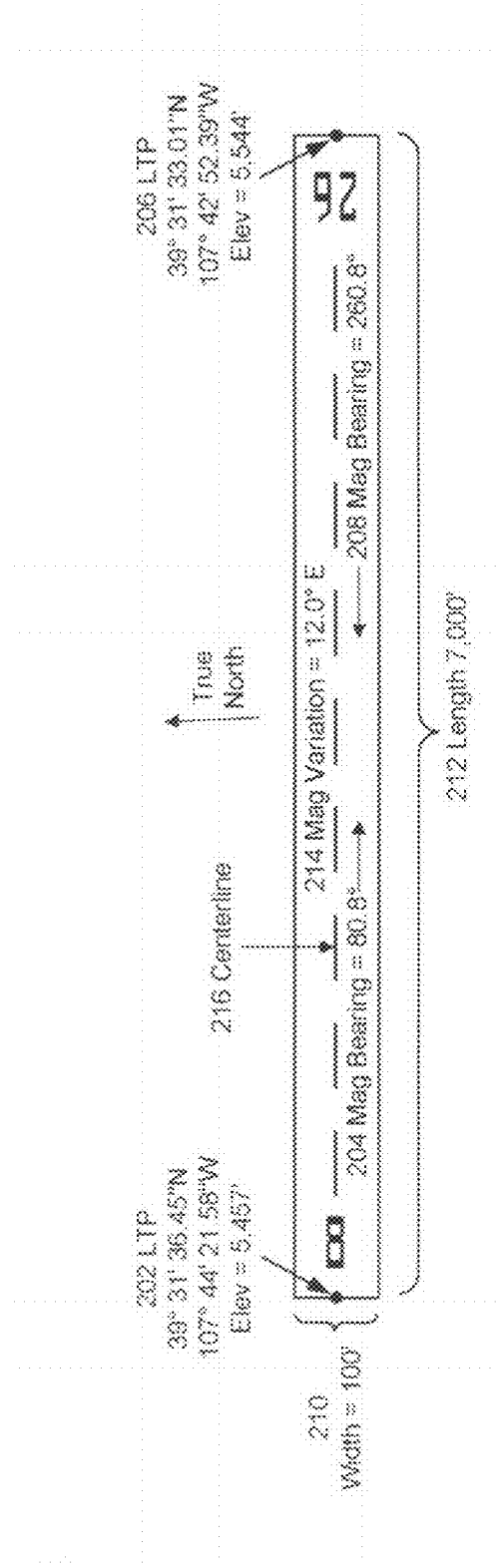
FIG. 3A illustrates a runway and a runway awareness zone based upon a landing threshold point.

A navigation reference data source 130 may be employed for delineating the boundaries of a runway awareness zone. In one embodiment, runway information contained in a runway record from a flight navigation database 132 employing standards of the ARINC 424 specification could be used to derive four corners of a runway awareness zone from which the boundaries could be delineated. For example, fields of the runway record include data representative of, but not limited to, the landing threshold point ("LTP"), the elevation of the LTP, runway width, the magnetic bearing, and the magnetic variation of the runway. The data associated with Runways 8-26, rounded off pursuant to the ARINC specification, is shown in FIG. 3A. The data indicates that the LTP 202 for Runway 8 is located at latitude ("lat.") 39°31'36.45"N., longitude ("long.") 107°44'21.58"W and has an elevation of 5,547' mean sea level ("MSL"); the magnetic bearing 204 of the runway is 80.8°. The data indicates that the LTP 206 for Runway 26 is located at lat. 39°31'33.01"N, long. 107°42'52.39"W and has an elevation of 5,544' MSL; the magnetic bearing 208 of the runway is 260.8°. The data indicates that the width 210 of Runways 8-26 is 100', the length 212 is 7,000', and magnetic variation 214 is 12.0°E.

Figure 3B:
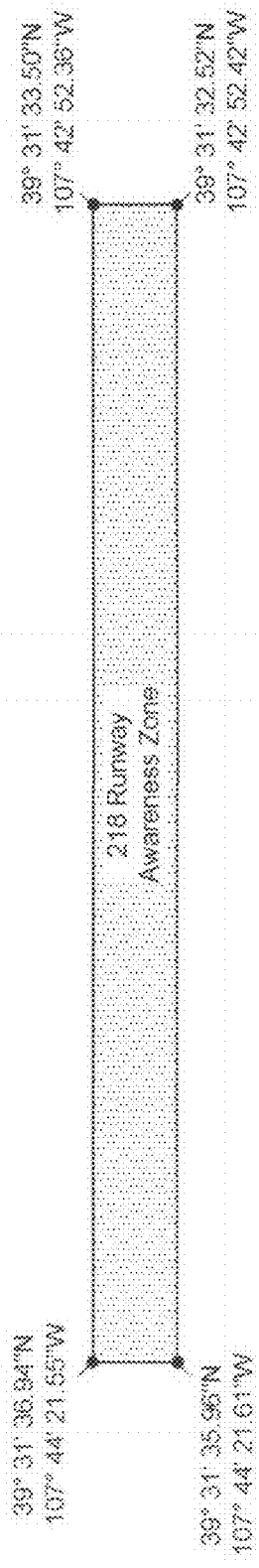
FIG. 3B illustrates a runway and a runway awareness zone based upon the latitude and longitude coordinates of four corners.

There are a plurality of techniques in which a runway awareness zone may be determined from which a manufacturer or end-user may choose in establishing a runway awareness zone. In one embodiment, four corners of Runways 8-26 may be determined using the data of LTP 202, LTP 206, and width 210 by applying one or more formulas known to those skilled in the art, where LTP 202 and LTP 206 may be used to determine a runway centerline 216 from which half of the width 210 may be applied to each side of the centerline. The determination of the location of the four corners may be used to delineate the boundaries of a runway awareness zone 218. As shown in FIG. 3B, the runway awareness zone boundaries are delineated by latitude/longitude coordinates of the locations of the four corners. These boundaries could be used for either Runway 8 or Runway 26. Although not shown, it should be noted that the application of a great circle formula renders the length of Runways 8-26 to be 6,997.30'.

In an alternative embodiment, the four corners used to delineated boundaries of a runway awareness zone for Runway 8 may be established with a derivation technique using LTP 202, magnetic bearing 204, runway width 210, runway length 212, and magnetic variation 214 by applying one or more formulas, where a runway centerline 216 may be projected from the LTP 202 for a distance of runway length 212 in a true direction determined using magnetic bearing 204 and magnetic variation 214. Once the runway centerline has been determined, width 210 may be applied to each side of the centerline. The application of this technique would render a different runway awareness zone than in the preceding paragraph due, in part, to the rounding errors. Similarly, the four corners used to delineated boundaries of a runway awareness zone for Runway 26 may be determined using LTP 206, magnetic bearing 208, runway width 210, runway length 212, and magnetic variation 214. It should be noted that separate application of the technique for Runway 8 and Runway 26 discussed in this paragraph may render a different runway awareness zone for each runway which may, in turn, be different from the runway awareness zone determined in the preceding paragraph. As such, the manufacturer or end-user is provided with the flexibility of choosing which technique(s) to apply.

Although the preceding discussion has drawn from record fields established in accordance with a specific ARINC specification, the embodiments herein are not limited to the specification or those specific record fields discussed. Rather, the preceding discussion has provided examples of how a field or fields of a specific record could be used to establish a runway awareness zone. Although the ARINC specification provides detailed record formats, those skilled in the art will readily acknowledge that aviation standards such as those published by ARINC may be modified with subsequent changes, amendments, or revisions. The embodiments and discussion herein with respect to any ARINC specification are illustrations intended solely to provide examples and are in no way intended to be limited to those discussed and presented herein.

It should be noted that, as embodied herein, employing a derivation technique to establish a runway awareness zone may not be necessary when data provided by one or more data sources may already be representative of a runway awareness zone; for example, the latitude/longitude coordinates used for delineating the boundaries of a runway awareness zone could be provided by one or more data sources. Also, employing a derivation technique to establish a partitioned runway awareness zone (as will be discussed in detail below) may not be necessary when data provided by one or more data sources may already be representative of a partitioned runway awareness zone; for example, the latitude/longitude coordinates used for delineating the boundaries of a partitioned runway awareness zone could be provided by one or more data sources. As embodied herein, a runway awareness zone and/or a partitioned runway awareness zone may be established in a plurality of ways.

In an additional embodiment, a runway awareness zone may include a buffer zone by, for example, extending a runway centerline and/or expanding the width of a runway. As embodied herein, a manufacturer or end-user may have a plurality of options from which to choose how a runway awareness zone may incorporate a buffer zone. For the purpose of illustration and not limitation, examples of how a runway awareness zone may include a buffer zone will be discussed.

Figure 3C:
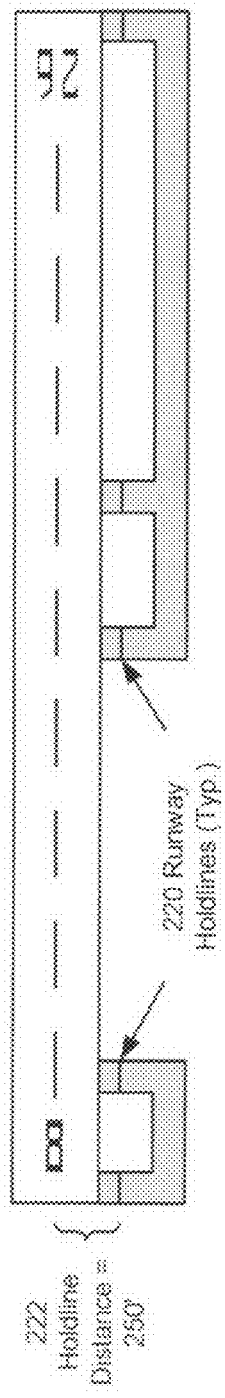
FIG. 3C illustrates a runway with holdlines.

A buffer zone could extend a runway centerline by including a displaced threshold. Known to those skilled in the art, a value of the distance of a displaced threshold may be included as a field in a runway record in a database. Also, a buffer zone could expand the width of the runway to include the distance of one or more runway holdlines. FIG. 3C illustrates holdlines 220 of taxiways adjacent to Runways 8-26. The distance between the runway centerline and holdlines 222 is shown to be 250'.

The placement of holdlines are provided by the United States Federal Aviation Administration ("FAA") and found in Advisory Circular AC 150/5300-13, an FAA Advisory Circular entitled "Airport Design" dated Sep. 29, 1989 and incorporating subsequent changes 1 through 13, inclusive. At the time of this writing, the Advisory Circular may be obtained on the Internet at http://www.faa.gov/airports_airtraffic/airports/resources/advisory_circulars/ or http://rgl.faa.gov/Regulatory_and_Guidance_Library/rgAdvisoryCircularnsf/MainFrame?Op enFrameSet. Although the Advisory Circular provides specific distances, those skilled in the art will readily acknowledge that aviation regulatory authorities such as the FAA may modify standards with subsequent changes, amendments, or revisions. Although the discussion of holdlines will be drawn to the Advisory Circular, the embodiments are neither limited nor restricted to runways of the United States or those with governing oversight of the FAA. It is known to those skilled in the art that aviation governing authorities throughout the world may have developed standards unique to their respective jurisdictions which may or may not employ similar standards. The embodiments disclosed herein could include all standards or schemes that could be developed or employed. The embodiments and discussion herein with respect to holdlines are illustrations intended solely to provide examples and are in no way intended to be limited to those discussed and presented herein.

At airports with operating control towers, holdlines may identify the location on a taxiway where a pilot is to stop when he or she does not have clearance to proceed onto the runway. At airports without operating control towers, these holdlines may identify the location where a pilot could assure there is adequate separation with other aircraft before proceeding onto the runway. Holdline standards stated in the Advisory Circular are distances measured from a runway centerline to an intersecting taxiway centerline and based on approach visibility minimums, airplane design group, and aircraft category assigned to the runway. Applicable visibility minimum criteria depend on whether the runway has lower than three-quarter (¾) mile approach visibility minimums. Airplane design group criteria is associated with runway width and may be divided into six (6) groups wherein each group is determined by tail size or wingspan of the aircraft for which the runway was designed. Category of aircraft criteria may be divided into one of five (5) categories wherein each category is determined by a stall speed of a specifically-configured aircraft for which the runway was designed.

In one embodiment, a navigation reference data source 130 may be employed in determining the category of a runway for the purposes of locating holdlines. In one embodiment, a navigation reference data source 130 could be any database from which an assigned distance holdline may be provided; the latitude/longitude locations of one or more holdlines may be provided; or approach visibility minimums, airplane design group, and aircraft category assigned to the runway may be provided from which a processor may be programmed to determined the distance.

In an alternative embodiment, a navigation reference data source 130 could be any database including, but not limited to, a flight navigation database 132 from which holdline distances may be estimated or approximated using some of the records conforming to the ARINC 424 specification. Such estimation may provide an ascertainable basis for which a buffer could be determined and included in a runway awareness zone. For instance, approach visibility minimums stated in the Advisory Circular may correspond to whether or not the approach is categorized as a precision approach or non-precision approach, where precision approaches could generally be considered as allowing visibility conditions that are less than ¾-statute mile and non-precision approaches could be generally considered as requiring visibility conditions not lower than ¾-statute mile.

Using ARINC 424 database records, an "IFR Capability" field of an airport record could be used to determine the presence of any published instrument approach procedures; if no instrument approach procedures have been published, then each runway at the airport could be categorized as a runway having approach visibility minimums equal to or greater than ¾-statute mile.

In another example, an "ILS/MLS/GLS Category" field of a runway record could be used to indicate the presence of a precision approach runway; if one is present, then the runway could be assigned as a runway having approach visibility minimums lower than ¾-statute mile. In another example, the "Approach Route Identifier" field of an airport approach record could be used to identify whether an established instrument approach procedure of a runway is a precision or non-precision approach. If the procedure is a precision approach, then the runway could be assigned as a runway having approach visibility minimums lower than ¾-statute mile; if the procedure is not a precision approach, then the runway could be categorized as a runway having approach visibility minimums equal to or greater than ¾-statute mile.

With respect to airplane design group criteria, a runway width field of a runway record may be used to identify the airplane design group for which the runway has been designed; if two or more groups share the same width, then the manufacturer or end-user may choose or select criteria from which to determine the airplane design group; for example, the group corresponding to the largest size of aircraft may be chosen or selected. With respect to category of aircraft criteria, the presence or lack of data in fields related to decision heights or minimum descent altitudes associated with the categories of an airport approach record (e.g., CAT D Decision Height, CAT B Minimum Descent Altitude, etc. . . . ) could be used to identify the category of aircraft for which the runway has been designed.

As stated above, holdline distances may be estimated or approximated using some of the records provided under the ARINC 424 specification. Data contained in a plurality of records indicating the presence of a precision approach for a runway (which may correspond to approach visibility minimums), a numerical runway width (which may correspond to airplane design group), and categories of aircraft approach may be employed to determine the applicable distance between the runway centerline and holdline pursuant to Advisory Circular criteria. The results of such estimation or approximation may be used for including a buffer in an expansion of a runway awareness zone.

It should be noted that, as embodied herein, employing a derivation technique to establish a runway awareness zone with a buffer may not be necessary when data provided by one or more data sources may already be representative of a runway awareness zone which includes a buffer. Also, employing a derivation technique to establish a partitioned runway awareness zone with a buffer may not be necessary when data provided by one or more data sources may already be representative of partitioned runway awareness zone. As embodied herein, a runway awareness zone and/or a partitioned runway awareness zone may be established in the plurality of ways.

Figure 3D:
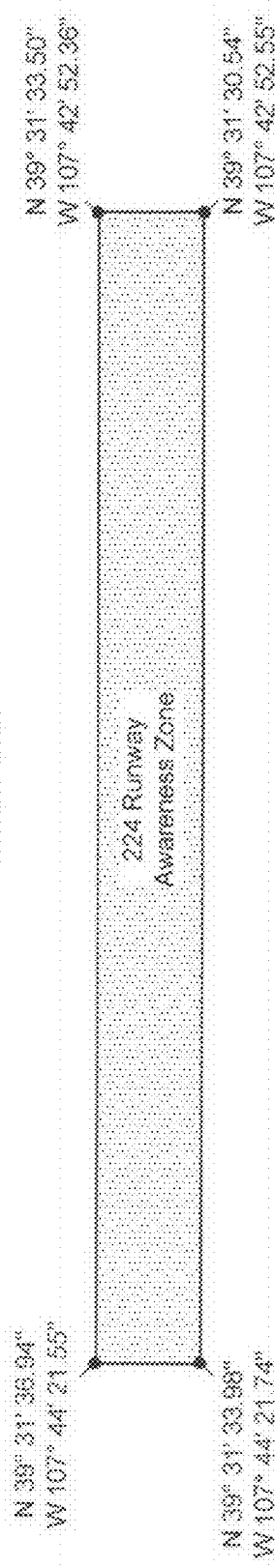
FIG. 3D illustrates a first runway awareness zones which includes a buffer.
Figure 3E:
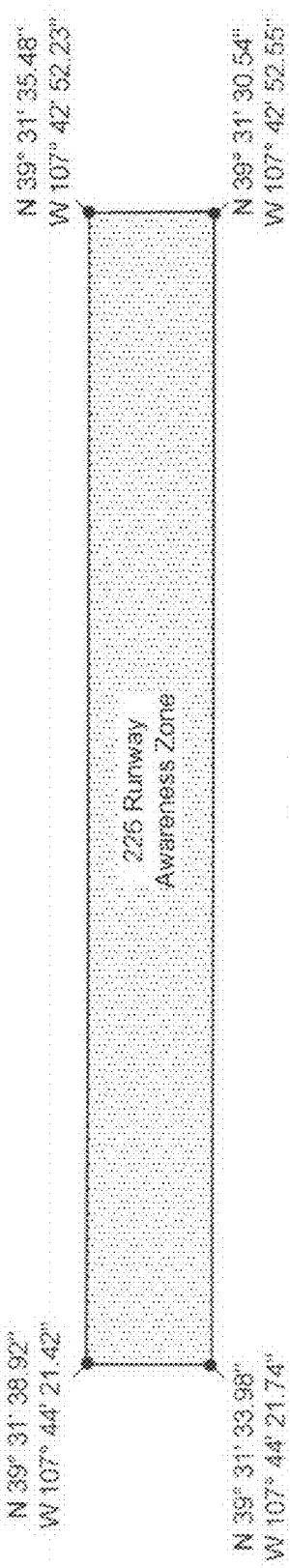
FIG. 3E illustrates a second runway awareness zones which includes a buffer.

The drawings of FIGS. 3C through 3E illustrate a runway awareness zone which includes a buffer by expanding the distance from the centerline to include holdlines 220. As discussed above, holdline distance 222 could be the distance assigned to Runways 8-26, the value of which (i.e., 250') may be stored in a database of a navigation reference data source 130. Alternatively, this distance could be an estimated or approximated distance derived using approach and runway records of a database of a navigation reference data source 130 as discussed above, and applying the data stored in the records to the criteria specified in the Advisory Circular.

In one embodiment, if the actual locations (e.g., latitude/longitude coordinates) of the holdlines are not provided by a navigation reference data source 130, the lower corners (as shown in FIG. 3D) of a runway awareness zone of Runways 8-26 which includes a buffer may be determined using the data of LTP 202, LTP 206, and holdline distance 222 by applying one or more formulas, where LTP 202 and LTP 206 may be used to determine a runway centerline from which half of the holdline distance 222 may be applied to the holdline side of the centerline. The latitude/longitude coordinates of the corners that are associated with the holdlines are shown in FIG. 3D. It should be noted that the latitude/longitude coordinates of the corners associated with the runway (shown as the upper corners in FIG. 3D) have not changed because the technique has been applied to the holdline side of the centerline only. The determination of the location of the four corners may be used to delineate the boundaries of a runway awareness zone 224. These boundaries could be used for either Runway 8 or Runway 26.

In an alternative embodiment, a manufacturer may apply the technique of the preceding paragraph to both sides of the runway centerline equally even though holdlines are present on one side of the runway centerline only. If so, the corners of a runway awareness zone which includes a buffer may be determined using the data of LTP 202, LTP 206, and holdline distance 222 by applying one or more formulas, where LTP 202 and LTP 206 may be used to determine a runway centerline from which half of the holdline distance 222 may be applied to each side of the centerline. The latitude/longitude coordinates of the locations of the four corners of a runway awareness zone 226 are shown in FIG. 3E. As shown in FIG. 3E, the runway awareness zone boundaries are delineated by the locations of the four corners. These boundaries could be used for either Runway 8 or Runway 26.

In an alternative embodiment, the technique discussed above may be modified for determining runway awareness zone with a buffer, substituting holdline distance for runway width. The four corners of a runway awareness zone may be determined using the LTP, magnetic bearing, runway length, and magnetic variation by applying one or more formulas, where a runway centerline may be projected from the LTP for a distance of runway length in a true direction determined using magnetic bearing and magnetic variation; instead of runway width as discussed above, however, the holdline distance may be applied to one or both sides of the centerline once the runway centerline has been determined. Then, the locations of the corners may be determined from which the boundaries of a runway awareness zone may be defined. As noted above, the results from the application of this technique may apply to one runway only.

In an embodiment herein, a runway awareness zone may include a vertical buffer which includes, for instance, airspace in which aircraft are taking-off and/or landing. As embodied herein, a manufacturer or end-user may have the option of choosing or selecting the height at which a ceiling could be established for such airspace including, but not limited to, an airspace established by an aviation-governing authority for providing an obstacle-free zone above a runway. For example, the FAA provides for a runway obstacle-free zone in the Advisory Circular, where such runway obstacle-free zone includes airspace above the runway below 150' above the established airport elevation and centered on the runway centerline.

The drawings of FIG. 4 provide exemplary illustrations of how runway traffic may be depicted on a display unit using partitioned sections of a runway awareness zone. A runway awareness zone may be partitioned into a plurality of sections by a processor 150. If traffic penetrates or falls within a runway awareness zone, the section corresponding to the location occupied by the traffic may be determined. A surface depicted on a display unit such as, but not limited to, a runway surface or runway and taxiway surfaces may be used to present runway traffic information to the pilot by highlighting a portion of the depicted runway surface which corresponds to the partitioned section of the runway awareness occupied by the traffic.

FIG. 4A could illustrate a runway awareness zone established by a processor 150 by partitioning the runway into sixteen (16) sections using data representative of runway information or a runway awareness zone provided by a source of navigation reference data, where such runway awareness zone could have been established from runway information using one or more of the derivation techniques discussed in detail above; alternatively, FIG. 4A could illustrate a partitioned runway awareness zone established using data representative of a partitioned runway awareness zone provided by a source of navigation reference data. As embodied herein, the number of sections into which a runway awareness zone may be partitioned may be programmable or configurable by a manufacturer or end-user.

The drawings of FIGS. 4B through 4H, inclusive, may represent a runway depicted on a display unit used to present runway traffic information to the pilot where the display unit could be, but is not limited to, a strategic display unit 165 as illustrated in FIG. 2C; although the following discussion will be drawn to a runway surface and the illustration thereof, the embodiments herein could include any surface including, but not limited to, a runway and taxiway surfaces. As illustrated in FIG. 4B, a portion of the depicted runway surface corresponding to section 9 of a partitioned runway awareness zone has been highlighted which could indicate that runway traffic is located on the runway surface corresponding to that section of the partitioned runway awareness zone. As illustrated in FIG. 4C, an arrow has been included with the illustration of FIG. 4B which could further indicate movement of the runway traffic in the direction of the arrow. As embodied herein, the use of an arrow may be optional and not required, and such arrow could be a vector representing both direction and speed of traffic movement.

It should be noted that, although the highlighted portions of the runway surfaces provided as exemplary illustrations in the drawings are rectangular and entirely highlighted, surface highlighters are not limited to a rectangular shape and/or highlighters highlighting the entire portion corresponding to the section of the partitioned runway awareness zone occupied by traffic. As embodied herein, a portion of the depicted surface corresponding to the partitioned section of the runway awareness zone occupied by traffic could be substantially highlighted to leave, for instance, the appearance of a border around the highlighted portion from the non-highlighted portion. Also, any non-rectangular shapes could be used to highlight a portion of the surface including, but not limited to, circles, other polygons, and thick arrows such as the movement arrow discussed in the preceding paragraph. Also, a plurality of colors could be used for highlighters which could be used, among other uses, to indicate a level of threat associated with the traffic as discussed in detail below.

Two or more portions of a depicted runway surface may be highlighted simultaneously. As illustrated in FIG. 4D, portions of the depicted runway surface corresponding to sections 5 and 15 have been highlighted which could indicate that runway traffic is located in or occupies those sections of the partitioned runway awareness zone. The inclusion of the arrow may indicate that the runway traffic corresponding to section 5 is moving in the direction of the arrow. As illustrated in FIG. 4E, portions of the depicted runway surface corresponding to sections 1 and 14 have been highlighted which could indicate that runway traffic occupies those sections of the partitioned runway awareness zone. The inclusion of the arrow may indicate that the runway traffic corresponding to section 14 is moving in the direction of the arrow and exiting the runway awareness zone, which could indicate traffic crossing a runway. As embodied herein, highlighted multiple portions could indicate multiple aircraft crossing a runway at intersections.

The drawings of FIGS. 4F through 4H, inclusive, may represent a scenario in which the aircraft that has been cleared for take-off. In FIG. 4F, the presence of an arrow (here, a vector) and the highlighted portion of the depicted runway surface corresponding to section 1 may indicate that an aircraft has been cleared for take-off and has begun its take-off roll from the beginning of the runway. In FIG. 4G, the increased size of the vector and the highlighting of two portions of the depicted runway surface may indicate that an aircraft has gained speed in its take-off roll, has exited section 1, and has entered section 2 of the runway awareness zone. The darker and lighter shadings shown in FIG. 4G corresponding to sections 2 and 1, respectively, may indicate the use of a subtle transitioning effect as the traffic transitions from one section to the next. As embodied herein, a processor 150 may be programmed or configured to employ one or more transitioning effects such as, but not limited to, a fading or fizzling as traffic transitions between sections. In FIG. 4H, the increased size of the vector and the highlighting of two portions of the depicted runway surface may indicate that an aircraft continues to gain speed in its take-off roll, has exited section 2, and has entered section 3 of the runway awareness zone.

FIG. 5A provides an exemplary illustration of how the runway awareness zone of FIG. 4A may be partitioned into a fewer number of sections. FIG. 5A could illustrate a runway awareness zone established by a processor 150 by partitioning the runway into eight (8) sections using data representative of runway information or a runway awareness zone provided by a source of navigation reference data, where such runway awareness zone could have been established from runway information using one or more of the derivation techniques discussed in detail above; alternatively, FIG. 5A could illustrate a partitioned runway awareness zone established using data representative of a partitioned runway awareness zone provided by a source of navigation reference data.

The drawings of FIGS. 5B through 5H provide exemplary illustrations of how the same traffic information provided in the FIGS. 4B through 4H, respectively, may be presented by highlighting portions of a runway depicted in a three-dimensional perspective shown by at least one display unit such as, but is not limited to, those depicted in FIGS. 2A and 2B. Also, the traffic information of the runway surface illustrated in FIG. 5E is presented by the display unit of FIG. 2C

As stated above, alerts may be provided visually, aurally, and/or tactilely. The events or situations which trigger one or more alerts may vary greatly and may depend on regulations established by one or more aviation-governing authorities and/or standards-setting organizations. Alternatively, the needs of the manufacturer or end-user could dictate the events or situations. Those skilled in the art will appreciate the ability and ease with which executable software code may be reprogrammed or modified to facilitate the need of the manufacturer or end-user and/or current standards or adoption of subsequent standards without affecting or expanding the scope of the embodiments discussed herein.

In the following paragraphs, examples of scenarios or events which could trigger one or more alerts are provided solely to illustrate the ability with which a manufacturer or end user may define triggering events which may stem from traffic penetrating or operating in a runway awareness zone. These illustrations are intended to provide exemplary alert criteria that may be used in a runway traffic presentation system 100, and are not intended to provide a limitation to the embodiments discussed herein in any way, shape, or form.

The aviation industry has recognized five phases of which advisory information in the form of alerts may be required to prevent runway incursion: taxiing onto the runway, take-off and departure, approach to runway, landing and landing roll-out, and stopped or taxiing on the runway. With respect to the phase involving a first aircraft ("own-ship") taxiing onto the runway, a warning or caution alert could be presented if another aircraft taxis onto the runway, is taking-off or departing from the runway, is landing and rolling out on the runway, and/or has stopped or is taxiing on the same runway. As embodied herein, a manufacturer or end-user may configure a warning or caution alert using one or more criteria; alerting algorithms are known to those skilled in the art. For the purpose of illustration and not limitation, criteria of time, speed, and/or distance will be discussed.

As embodied herein, warning alert criteria may be established as a function of time, speed, and/or distance. If a spacing measurement between the own-ship and other aircraft ("traffic") indicates a spacing interval at or before a minimum warning time, speed and/or distance as configured or by a manufacturer or end-user, the processor could be programmed or configured to generate alert data representative of a red, non-textual visual warning alert highlighting the portion of a depicted runway surface corresponding to the section of the runway awareness zone in which the other aircraft is located; simultaneously, the processor could generate alert data representative of a red textual message "RUNWAY INCURSION" and/or an aural warning alert "WARNING—RUNWAY INCURSION" and provide such data to a display unit and/or aural alert unit, respectively. In another embodiment, non-textual and/or textual visual warning alerts could remain steady or flash intermittently, where such flashing could depend on the distance between an own-ship and another traffic, where such flashing could represent a specific range to the other traffic.

Similarly, caution alert criteria may be established as a function of time, speed, and/or distance. If a spacing measurement between the own-ship and other aircraft indicates a spacing interval at or before a minimum caution time, speed and/or distance as configured or set by a manufacturer or end-user, the processor could be programmed or configured to generate alert data representative of an amber or yellow, non-textual visual caution alert highlighting the portion of a depicted runway surface corresponding to the section of the runway awareness zone in which the other aircraft is located; simultaneously, the processor could generate alert data representative of an amber or yellow textual message "RUNWAY INCURSION" and/or an aural warning alert "CAUTION—RUNWAY INCURSION" and provide such data to a display unit and/or aural alert unit, respectively. In another embodiment, non-textual and/or textual visual warning alerts could remain steady or flash intermittently, where such flashing could depend on the distance between an own-ship and another traffic, or where such flashing could represent a specific range to the other traffic.

With respect to an own-ship operating in a take-off and departure phase from a runway, a warning alert could be presented if another aircraft taxis onto the runway in front of the own-ship, is taking-off or departing from the runway, is landing and rolling out on the runway, and/or has stopped or is taxiing on the same runway. Using warning alert criteria and/or caution alert criteria, a processor could generate alert data representative of the alert applicable to the level of threat in the same manner as discussed above.

With respect to an own-ship operating in an approach to runway phase, a warning alert could be presented if another aircraft taxis onto the runway, departs from the runway, lands and rolls-out on the runway, and/or is stopped or taxiing on the runway. Using warning alert criteria and/or caution alert criteria, a processor could generate alert data representative of the alert applicable to the level of threat in the same manner as discussed above.

With respect to an own-ship operating in a landing and landing roll-out phase, a warning alert could be presented if another aircraft taxis onto the runway, departs from the runway, lands and rolls-out on the runway, and/or is stopped or taxiing on the runway. Using warning alert criteria and/or caution alert criteria, a processor could generate alert data representative of the alert applicable to the level of threat in the same manner as discussed above.

With respect to an own-ship operating in a stopped or taxiing on the runway phase, a warning alert could be presented if another aircraft taxis onto the runway, departs from the runway, lands and rolls-out on the runway, and/or is stopped or taxiing on the runway. Using warning alert criteria and/or caution alert criteria, a processor could generate alert data representative of the alert applicable to the level of threat in the same manner as discussed above.

Figure 6:
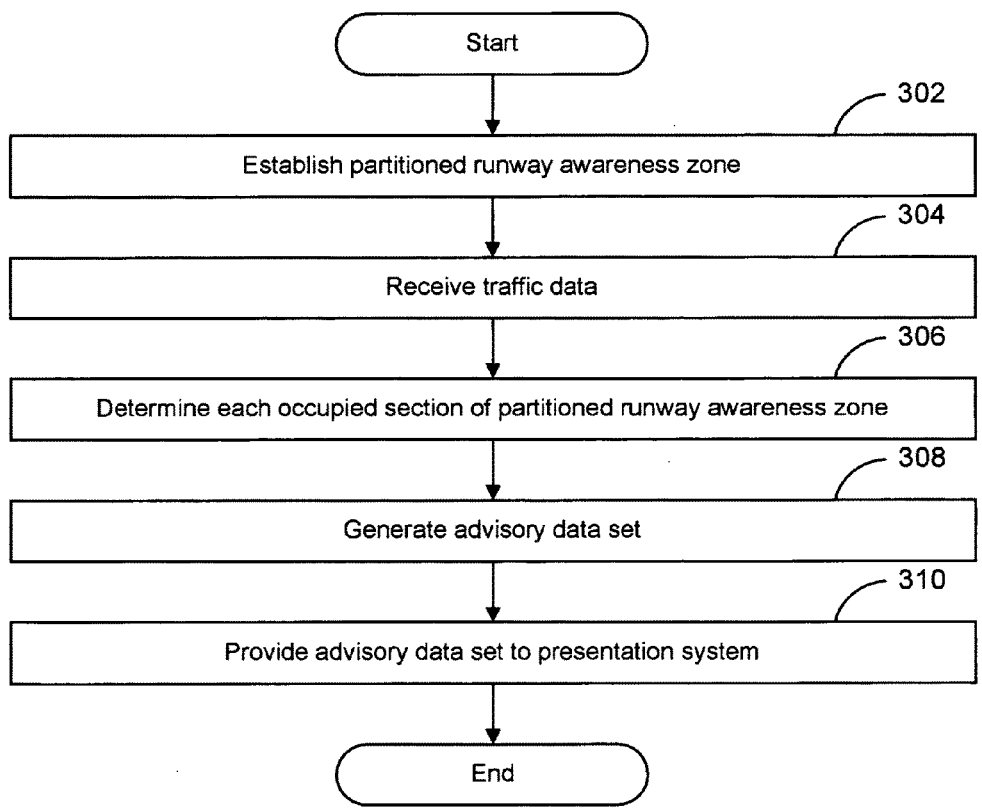
FIG. 6 depicts a flowchart of a method for presenting runway traffic information.

FIG. 6 depicts a flowchart 300 of an example of a method for presenting runway traffic information. As embodied herein, this method could be employed in a portable device, including but not limited to, a handheld device presenting traffic information visually and/or aurally. The flowchart begins with module 302 with the establishing of a partitioned runway awareness zone of a runway using navigation reference data received from a navigation reference data source. As embodied herein, a navigation reference data source 130 could include a flight navigation database 132, a taxi navigation database 134, and/or another aircraft system 136. As embodied herein, the receiving of any data by a processor 150 or the providing of data to a processor 150 may inherently include a step in which the processor performs a retrieval operation of such data.

In one embodiment, navigation reference data may be comprised of data representative of runway information including, but not limited to, at least LTP, the elevation of the LTP, runway width, the magnetic bearing, and the magnetic variation of the runway, which may be received by a processor, either in part or in whole, to delineate a runway awareness zone and partition such zone into sections, thereby establishing a partitioned runway awareness zone. In another embodiment, data representative of a runway awareness zone may be received by a processor which may partition such zone into sections, thereby establishing a partitioned runway awareness zone. In another embodiment, data representative of a partitioned runway awareness zone may be received by a processor, thereby establishing a partitioned runway awareness zone. As embodied herein, the number of sections of a partitioned runway awareness zone could be programmable or configurable by a manufacturer or end-user.

A runway awareness zone could provide a buffer zone by extending and/or expanding beyond the boundaries of a runway including, but not limited to, adding displaced threshold information contained in the navigation reference data and/or adding runway holdline information, respectively, where such holdline information could be contained by navigation reference data or estimated using navigation reference data. Also, an altitude above the runway could be established as a ceiling for the runway awareness zone.

The flowchart continues with module 304 with the receiving of traffic data. Such data may be provided to a processor 150 by a traffic data source 140. As embodied herein, a traffic data source 140 could include an ADS-B system 142, a TIS-B system 144, an ADS-R system 146, and/or forward-looking radar system 148.

The flowchart continues with module 306 with the determining of each section of a partitioned runway awareness zone occupied by the traffic. If traffic has penetrated or falls within a partitioned runway awareness zone, the section occupied by traffic may be determined by a processor 150 using the location of the traffic and determining which partitioned section the traffic occupies.

The flowchart continues with module 308 with the generation of an advisory data set by a processor 150 and module 310 with the providing of the advisory data set to a presentation system 160. The advisory data set may include advisory data for each section of a partitioned runway awareness zone occupied by traffic. In one embodiment, advisory data could represent visual non-textual advisory information such as, but not limited to, a highlighted portion of a depicted surface presented to a recipient on a visual display unit including, but not limited to, a tactical display unit 164 and a strategic display unit 165; additionally, the highlighted portion could include a traffic movement indicator. In another embodiment, advisory data could represent visual textual advisory information such as, but not limited to, "RUNWAY TRAFFIC" presented to a recipient on a visual display unit. In another embodiment, advisory data could represent aural advisory information such as, but not limited to, "RUNWAY TRAFFIC" presented to a recipient using an aural alert unit.

In an additional embodiment, a processor 150 could receive data from a navigation system 110 representative of navigation information including, but not limited to, location, altitude, speed, and/or heading. Using the navigation data and traffic data, a processor 150 could determine a level of threat between an own-ship and other traffic. Depending on the level of threat, advisory data could include alert data corresponding to the level of threat. As embodied herein, one level of threat could be associated with warning alert criteria, a second level of threat could be associated with caution alert criteria, and a third level of threat could comprise of non-alert criteria. As embodied herein, a manufacturer or end-user may configure the level of threat and/or alert corresponding to the threat using one or more criteria.

In one embodiment, warning alert criteria may be established as a function of a first time, speed and/or distance. If a spacing measurement between the own-ship and other traffic indicates a spacing interval at or before a minimum warning time, speed and/or distance as configured or by a manufacturer or end-user, alert data could include warning alert data. When an advisory data set is provided to a presentation system, advisory data could represent visual non-textual advisory information such as, but not limited to, a portion of a depicted surface highlighted with the color associated with the warning alert (e.g., red). Similarly, advisory data could represent visual textual advisory information such as, but not limited to, "RUNWAY INCURSION" shown in red. Also, advisory data could represent aural advisory information such as, but not limited to, "WARNING—RUNWAY INCURSION" presented to a recipient. In another embodiment, non-textual and/or textual visual warning alerts could remain steady or flash intermittently, where such flashing could depend on the distance between an own-ship and another traffic, where such flashing could represent a specific range to the other traffic. Also, advisory data could represent tactile advisory information such as, but not limited to, a "stick-shaker" presented to a recipient.

In another embodiment, caution alert criteria may be established as a function of a second time, speed and/or distance. If a spacing measurement between the own-ship and other traffic indicates a spacing interval at or before a minimum caution time, speed and/or distance as configured or by a manufacturer or end-user, alert data could include caution alert data. When an advisory data set is provided to a presentation system, advisory data could represent visual non-textual advisory information such as, but not limited to, a portion of a depicted surface highlighted with the color associated with the caution alert (e.g., amber or yellow). Similarly, advisory data could represent visual textual advisory information such as, but not limited to, "RUNWAY INCURSION" shown in amber or yellow. Also, advisory data could represent aural advisory information such as, but not limited to, "CAUTION—RUNWAY INCURSION" presented to a recipient. In another embodiment, non-textual and/or textual visual warning alerts could remain steady or flash intermittently, where such flashing could depend on the distance between an own-ship and another traffic, or where such flashing could represent a specific range to the other traffic.

In another embodiment, if neither warning criteria nor caution criteria are met, advisory data could represent visual non-textual information such as, but not limited to, a portion of a depicted surface highlighted with a color associated with a non-alert. Similarly, advisory data could represent an appropriate visual textual advisory shown in a color associated with a non-alert. Also, advisory data could represent appropriate aural advisory information. Then, the flowchart proceeds to the end.

It should be noted that the method steps described above may be embodied in computer-readable media as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system for presenting runway traffic information, said system comprising:
    a source of navigation reference data;
    a source of traffic data;
    a processor configured to
        establish a one partitioned runway awareness zone of one runway from navigation reference data received from the source of navigation reference data, where the partitioned runway awareness zone of one runway is one runway awareness zone partitioned into a plurality of contiguous, rectangular sections,
        receive traffic data, where
            the traffic data is representative of traffic other than own-ship.
        determine at least one rectangular section of the plurality of contiguous, rectangular sections occupied by traffic,
        generate an advisory data set based upon the determination and independently of own-ship's position, where
            the advisory data set is comprised of advisory data representative of
                at least one first visual highlighter highlighting each rectangular section presently occupied by traffic in its entirety, and
                at least one second visual highlighter highlighting each rectangular section previously occupied by traffic in its entirety, where
                    each first visual highlighter and each second highlighter are non-textual, and
        provide the advisory data set to a presentation system; and
    the presentation system configured to
        receive the advisory data set, and present the advisory information represented in the advisory data to a recipient, thereby highlighting each rectangular section of presently occupied and previously occupied by traffic in its entirety.

2. The system of claim 1, wherein the data received from the source of navigation reference data is representative of runway information or runway awareness zone information from which the partitioned runway awareness zone is established using a derivation technique.

3. The system of claim 1, wherein the data received from the source of navigation reference data is representative of a partitioned runway awareness zone.

4. The system of claim 1, wherein the advisory data is further representative of at least one of the following: textual, visual advisory information, aural advisory information, and tactile advisory information.

5. The system of claim 1, wherein
the advisory data set is further comprised of
a first directional indicator partially overlapping at least one first visual highlighter only when traffic travels within the runway awareness zone.

6. The system of claim 4, further comprising:
a source of navigation data, and
the processor is further configured to
receive navigation data, and
determine a level of threat from the traffic data and the navigation data, whereby
the advisory data is further representative of alert information corresponding to the level of threat.

7. The system of claim 1, wherein the processor is a processor of at least one of the following: the navigation reference data source, the traffic data source, the presentation system, and a navigation source.

8. The system of claim 1, wherein the presentation system includes at least one of the following: a visual display unit, an aural alert unit, and a tactile alert unit.

9. A module for presenting runway traffic information, said module comprising:
an input communications interface;
an output communications interface; and
a processor configured to
establish one partitioned runway awareness zone of one runway from navigation reference data received from the source of navigation reference data, where
the partitioned runway awareness zone of one runway is one runway awareness zone partitioned into a plurality of contiguous, rectangular sections,
receive traffic data from a source of traffic data, where the traffic data is representative of traffic other than own-ship,
determine at least one rectangular section of the plurality of contiguous, rectangular sections occupied by traffic,
generate an advisory data set based upon the determination and independently of own-ship's position, where
the advisory data set is comprised of advisory data representative of
at least one first visual highlighter highlighting each rectangular section presently occupied by traffic in its entirety, and
at least one second visual highlighter highlighting each rectangular section previously occupied by traffic in its entirety, where
each first visual highlighter and each second highlighter are non-textual, and provide the advisory data set to a presentation system, such that
the advisory information represented in the advisory data is presented to a recipient, thereby
highlighting each rectangular section of presently occupied and previously occupied by traffic in its entirety.

10. The module of claim 9, wherein the data received from a source of navigation reference data is representative of runway information or runway awareness zone information from which the partitioned runway awareness zone is established using a derivation technique.

11. The module of claim 9, wherein the data received from a source of navigation reference data is representative of a partitioned runway awareness zone.

12. The module of claim 9, wherein the advisory data is further representative of at least one of the following: textual, visual advisory information, aural advisory information, and tactile advisory information.

13. The module of claim 9, wherein
the advisory data set is further comprised of
a first directional indicator partially overlapping at least one first visual highlighter only when traffic travels within the runway awareness zone.

14. The module of claim 12, wherein the processor is further configured to
receive navigation data, and
determine a level of threat from the traffic data and the navigation data, whereby
the advisory data is further representative of alert information corresponding to the level of threat.

15. The module of claim 9, wherein the module is a module of at least one of the following: the navigation reference data source, the traffic data source, the presentation system, and a navigation source.

16. A method for presenting runway traffic information, where such method is performed by an aircraft avionics system processor, said method comprising:
establishing one partitioned runway awareness zone of one runway from navigation reference data received from the source of navigation reference data, where
the partitioned runway awareness zone of one runway is one runway awareness zone partitioned into a plurality of contiguous, rectangular sections;
receiving traffic data from a source of traffic data, where the traffic data is representative of traffic other than own-ship;
determining at least one rectangular section of the plurality of contiguous, rectangular sections occupied by traffic;
generating an advisory data set based upon the determination and independently of own-ship's position, where
the advisory data set is comprised of advisory data representative of
at least one first visual highlighter highlighting each rectangular section presently occupied by traffic in its entirety, and
at least one second visual highlighter highlighting each rectangular section previously occupied by traffic in its entirety, where
each first visual highlighter and each second highlighter are non-textual; and
providing the advisory data set to a presentation system, such that
the advisory information represented in the advisory data is presented to a recipient, thereby highlighting each rectangular section of presently occupied and previously occupied by traffic in its entirety.

17. The method of claim 16, wherein the data received from a source of navigation reference data is representative of runway information or runway awareness zone information from which the partitioned runway awareness zone is established using a derivation technique.

18. The method of claim 16, wherein the data received from a source of navigation reference data is representative of a partitioned runway awareness zone.

19. The method of claim 16, wherein the advisory data is further representative of at least one of the following: textual, visual advisory information, aural advisory information, and tactile advisory information.

20. The method of claim 16, wherein
the advisory data set is further comprised of
a first directional indicator partially overlapping at least one first visual highlighter only when traffic travels within the runway awareness zone.

21. The method of claim 19, further comprising:
receiving navigation data; and
determining a level of threat from the traffic data and the navigation data, whereby
the advisory data is further representative of alert information corresponding to the level of threat.

* * * * *